US009055625B2

(12) United States Patent
Lin et al.

(10) Patent No.: US 9,055,625 B2
(45) Date of Patent: Jun. 9, 2015

(54) CONTROL METHOD OF LAMP

(71) Applicant: Lextar Electronics Corporation, Hsinchu (TW)

(72) Inventors: Feng-Ling Lin, Pingtung (TW); Po-Shen Chen, New Taipei (TW); Hui-Ying Chen, Changhua County (TW); Chun-Kuang Chen, Taipei (TW); Yuan-Ching Chen, Kaohsiung (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 262 days.

(21) Appl. No.: 13/887,437

(22) Filed: May 6, 2013

(65) Prior Publication Data
US 2013/0307433 A1    Nov. 21, 2013

Related U.S. Application Data

(60) Provisional application No. 61/643,938, filed on May 8, 2012.

(51) Int. Cl.
| G05F 1/00 | (2006.01) |
| H05B 37/00 | (2006.01) |
| H05B 37/02 | (2006.01) |
| H05B 33/08 | (2006.01) |

(52) U.S. Cl.
CPC ............ *H05B 37/02* (2013.01); *H05B 33/0863* (2013.01); *Y02B 20/341* (2013.01); *H05B 37/0272* (2013.01)

(58) Field of Classification Search
CPC ............... H05B 37/02; H05B 33/0863; H05B 37/0272; Y02B 20/341
USPC .................................... 315/291, 292, 307, 312
See application file for complete search history.

(56) References Cited

U.S. PATENT DOCUMENTS

| 5,769,527 | A * | 6/1998 | Taylor et al. ..................... 362/85 |
| 6,211,626 | B1 * | 4/2001 | Lys et al. ........................ 315/291 |
| 6,914,395 | B2 * | 7/2005 | Yamauchi et al. ............. 315/308 |
| 6,914,893 | B2 * | 7/2005 | Petite ............................. 370/338 |
| 7,236,154 | B1 * | 6/2007 | Kerr et al. ...................... 345/102 |
| 7,352,138 | B2 | 4/2008 | Lys et al. |
| 7,884,732 | B2 * | 2/2011 | Huizenga ...................... 340/635 |
| 7,925,384 | B2 * | 4/2011 | Huizenga et al. ............. 700/277 |
| 8,947,005 | B2 * | 2/2015 | Noble et al. ............... 315/200 A |
| 2004/0156203 | A1 | 8/2004 | Hata |
| 2005/0099824 | A1 | 5/2005 | Dowling et al. |
| 2007/0185631 | A1 | 8/2007 | Yeh et al. |
| 2011/0133655 | A1 | 6/2011 | Recker et al. |
| 2012/0074850 | A1 | 3/2012 | Tanaka et al. |

OTHER PUBLICATIONS

EP Search Report dated Nov. 7, 2014.

\* cited by examiner

*Primary Examiner* — Kenneth Wells
(74) *Attorney, Agent, or Firm* — McClure, Qualey & Rodack, LLP

(57) ABSTRACT

The control method comprises the following steps. Firstly, whether a touch event occurs in a control device is determined. Then, responding to a color temperature set and a brightness set from the control device, a first PWM and a second PWM is generated. Then, whether the lamp connects with to the control device is determined. Then, the first PWM and the second PWM is packaged in a color control package if the lamp connects with to the control device. Then, the color control package is transmitted to the lamp in wireless.

11 Claims, 3 Drawing Sheets

CONTROL METHOD OF LAMP

This application claims the benefit of U.S. provisional application Ser. No. 61/643,938, filed May 8, 2012, the subject matter of which is incorporated herein by reference.

BACKGROUND OF THE INVENTION

1. Field of the Invention

The invention relates in general to a control method of a lamp, and more particularly to a control method of a lamp capable of controlling the lamp in wireless technology.

2. Description of the Related Art

Conventional lamp is controlled by a solid electrical wire. For example, a switch disposed on a wall is directly connected to the lamp by the solid electrical wire for being controlled to switch the lamp on or off. However, such design is limited to a geographical disposition of the lamp, and hence the lamp can't be controlled effectively.

SUMMARY OF THE INVENTION

According to one embodiment of the present invention, a control method of a lamp is provided. The control method comprises the following steps. Whether a touch event occurs in a control device is determined; obtaining a coordinate of a touch point if the touch event occurs; whether the touch point occurs in a color control area of a Graphical User Interface (GUI) of the control device is determined; responding to a color temperature set and a brightness set from the control device, generating a first pulse width modulation (PWM) and a second PWM; whether the lamp connects with to the control device is determined; package the first PWM and the second PWM in a color control package; a transmission thread is opened, wherein the step of opening the transmission thread comprises the following steps: whether the value of a transmission flag is equal to 1 is determined; transmitting the color control package to the lamp by wireless technology if the value of the transmission flag is equal to 1; the value of a responding flag is set to 0; and whether the value of the responding flag is set to 0 within a time interval is determined; and a receiving thread is opened, wherein the step of opening the receiving thread comprises the following steps: whether a lamp package from the lamp is received is determined after the color control package is transmitted to the lamp; whether the lamp package is a responding package is determined if the lamp package from the lamp is received; the value of the responding package is set to 1 and the value of the transmission flag to 0 if the lamp package is the responding package.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
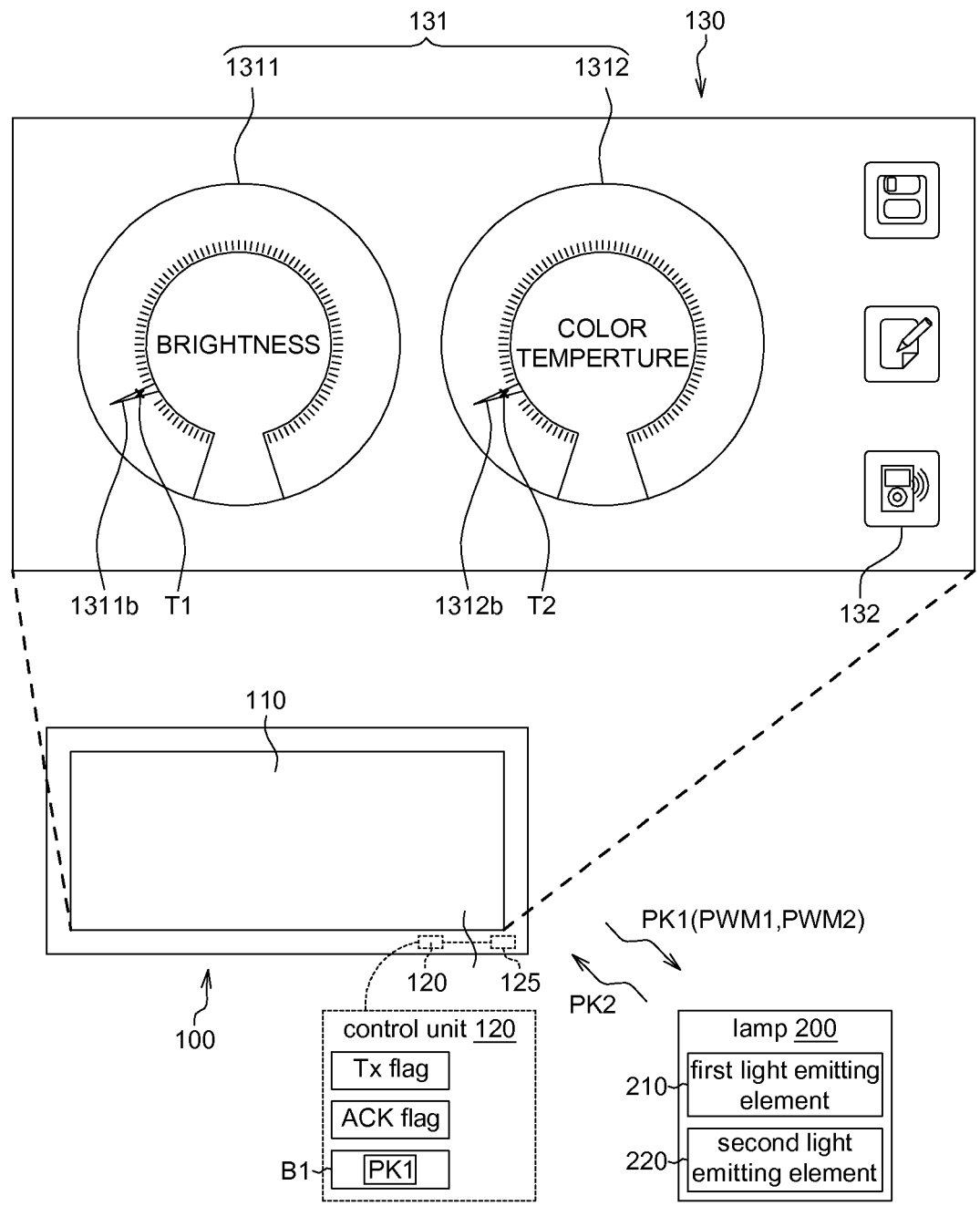
FIG. 1 shows a Graphical User Interface of a control device according to an embodiment of the invention.

Referring to FIG. 1 a GUI of a control device according to an embodiment of the invention is shown. The control device 100, such as a cell-phone, a personal digital assistant (PDA) or other handheld electronic device, comprises an output device 110, a control unit 120, a wireless module 125 and a GUI 130. In the present embodiment, the output device 110 is a display device, and the control unit 120 controls the output device 110 to display a frame of the GUI 130 for adjusting brightness and/or a color temperature of a lamp 200 comprising the first light-emitting element 210 and the second light-emitting element 220. In another embodiment, the output device 110 comprises at least one button, and the control unit 120 controls the brightness and/or the color temperature of the lamp 200 according to a signal from the triggered button. Since the brightness and the color temperature of the lamp 200 can be adjusted by the control device 100 through wireless communications protocol, the application to the lamp 200 and the control device 100 is expanded.

The wireless module 125 can transmit a wireless signal, such as a package, to the lamp 200. The control unit 120 and the wireless module 125 can be formed by any known semiconductor process. Alternatively, at least one of the control unit 120 and the wireless module 125 is firmware. In one embodiment, the control unit 120 and the wireless module 125 can be integrated into one piece. In another embodiment, the control unit 120 and the wireless module 125 can be severally formed, and then electrically connected to each other via any known technique.

The GUI 130 provides a color control area 131 comprising a brightness control area 1311 and a color temperature control area 1312. The position of a brightness control bar 1311b decides desired brightness of the lamp 200, and the position of a color temperature control bar 1312b decides a desired color temperature of the lamp 200. The GUI 130 further provides a virtual connection button 132 for performing a wireless connection between the control device 100 and the lamp 200.

Figure 2A:
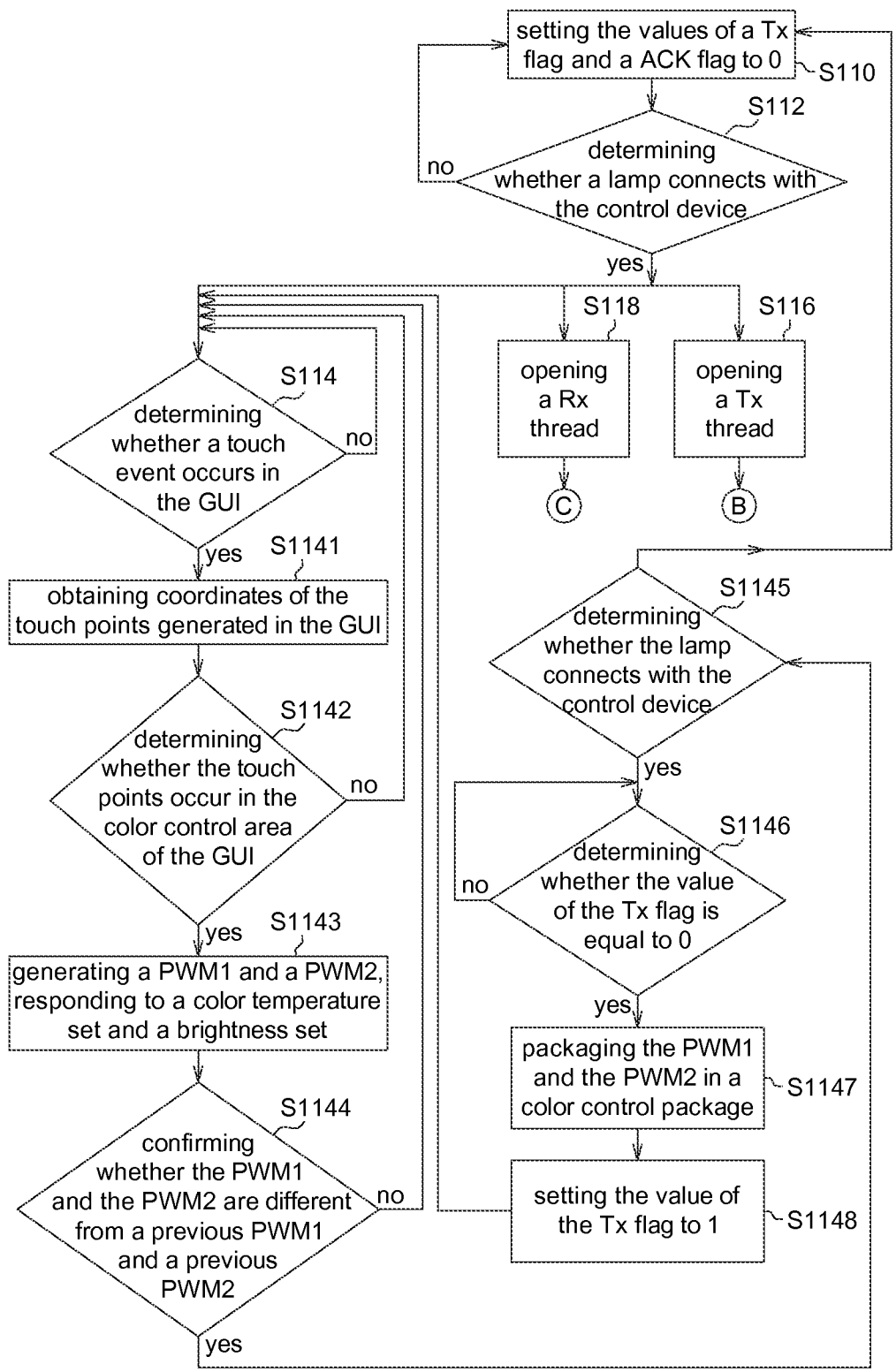
FIGS. 2A-2B show a flowchart of the control device controlling the lamp by the GUI.
Figure 2B:
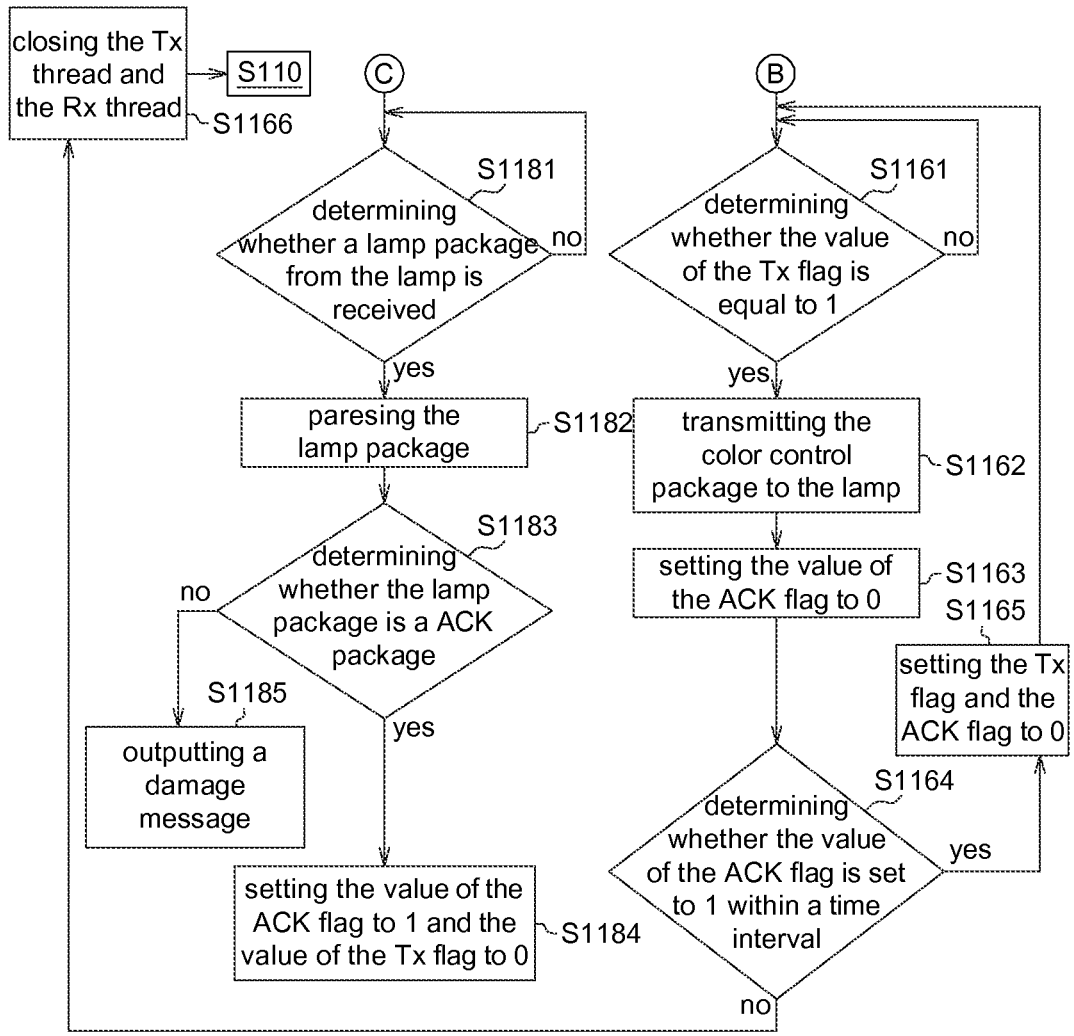

Referring to FIGS. 2A-2B, a flowchart of the control device controlling the lamp by the GUI are shown.

Referring to FIG. 2A, in step S110, the value of a transmission flag (hereinafter referred to as Tx flag) and the value of a responding flag (hereinafter referred to as ACK flag) are set to 0.

In step S112, the control device 100 determines (or judges) whether the lamp 200 connects with the control device 100 in wireless. For example, user can trigger the virtual connection button 132 provided in the GUI 130 to connect the lamp 200 with the control device 100 by wireless technology. If the lamp 200 connects with the control device 100, process proceeds to step S114, step S116 and step S118 simultaneously by way of time division multiplexing (TDM) or other applicable technique. If the lamp 200 has not connected with the control device 100, process returns to step S110 to wait for a wireless connection between the control device 100 and the lamp 200.

In step S114, the control device 10 determines whether a touch event occurs in the GUI 130. If the touch event occurs, step S1141 is performed; if the touch event has not occurred, process returns to step S141. For example, user can adjust a brightness control bar 1311b provided in the GUI 130 to a desired position for obtaining a desired brightness and a color temperature control bar 1312b provided in the GUI 130 to a desired position for obtaining a desired color temperature, and then step S1141 is performed.

In step S1141, the control unit 120 obtains two coordinates of the touch points T1 and T2 generated in the GUI 130.

In step S1142, the control unit 120 determines whether the touch points occur in the color control area 131 of the GUI 130 of the control device 100. If the touch points occur in the color control area 131 of the GUI 130 of the control device 100, the touch points T1 and T2 represent a brightness set and a color temperature set respectively, and then process proceeds to step S1143; if the touch point does not occur in the color control area 131 of the GUI 130 of the control device 100, process returns to step S114 to continue to determine whether any touch point occurs in the color control area 131 of the GUI 130 of the control device 100.

In step S1143, the control unit 120 generates a first PWM (hereinafter referred to as PWM1) and a second PWM (hereinafter referred to as PWM2), responding to the color temperature set and the brightness set, wherein the PWM1 and the PWM2 are decided by the following formula (1) and (2) for controlling the first light-emitting element 210 and the second light-emitting element 220 respectively. When the lamp 200 receives the PWM1 and PWM2 (in step S1184 flowing from step S1183), the first light-emitting element 210 and the second light-emitting element 220 to generate a first light and a second light, respectively, and then the first light and the second light blend to form an expected-color light.

$$PWM1 = \frac{0.0015 \times Br - 0.084}{0.002 \times e^{(0.0021 \times CCT)} + 0.996} \quad (1)$$

$$PWM2 = 0.996 \times PWM1 + 0.0051 \times Br - 0.0084 \quad (2)$$

In formula (1) and (2), the Br represents the brightness set in accordance with the brightness control area 1311, and the CCT represents the color temperature set in accordance with the color temperature control area 1312. The constants, such as 0.0015, 0.084, 0.002 and 0.996, are not limited to present embodiment of the invention.

In step S1144, the control unit 120 confirms whether the PWM1 and the PWM2 are different from a previous PWM1 and a previous PWM2, respectively. For example, if the current PWM1 and the current PWM2 represent a new touch event, the PWM1 and the PWM2 are different from the previous PWM1 and the previous PWM2, and then process proceeds to step S1145. If the current PWM1 and the current PWM2 represent the same touch event (i.e. the same position of the color control area 131 are touched twice or more), the current PWM1 and the current PWM2 are substantially the same as or close to the previous PWM1 and the previous PWM2, and then process returns to step S114.

In step S1145, the control unit 120 determines whether the lamp 200 connects with the control device 100. If the lamp 200 connects with the control device 100, process proceeds to step S1146. If the lamp 200 disconnects with the control device 100, process returns to step S114.

In step S1146, the control unit 120 determines whether the value of the Tx flag is equal to 0. If the value of the Tx flag is equal to 0, it means that no package ready for being transmitted is stored in a buffer B1, and then process proceeds to step S1147. If the value of the Tx flag is not equal to 0, it means that any package which has been stored in the buffer B1 will be ready for being transmitted, and thus process returns to step S1146.

In step S1147, the control unit 120 packages the PWM1 and the PWM2 in a color control package PK1, and then put the color control package PK1 to the buffer B1 for transmitting the color control package PK1 to the lamp device 200.

In step S1148, the control unit 120 sets the value of the Tx flag to 1, such that the color control package PK1 is in a transmissible state, and thus the color control package PK1 can be transmitted to the lamp 200 in step S1162 (described below) flowing from step S1161 (described below).

In step S116, the control unit 120 opens a transmission thread (hereinafter referred to as Tx thread) for transmitting the color control package PK1 to the lamp 200.

Referring to FIG. 2B, in step S1161, the control unit 120 determines whether the value of the Tx flag is equal to 1. If the value of the Tx flag is equal to 1, it means that the color control package PK1 stored in the buffer B1 is ready for being transmitted, and then process proceed to step S1162. If the value of the Tx flag is not equal to 1, it means that no package (such as, the color control package PK1) ready for being transmitted is stored in a buffer B1, and thus process returns to step S1161.

In step S1162, the control unit 120 controls the wireless module 140 to transmit the color control package PK1 to the lamp 200 by any known wireless technology.

In step S1163, the control unit 120 sets the value of the ACK flag to 0 (that is, the ACK flag is cleared) for avoiding step S1164 proceeding to step S1165 wrongly.

In step S1164, the control unit 120 determines whether the value of the ACK flag is set to 1 within a time interval, such as 500 milliseconds or other appropriate time interval. If the value of the ACK flag is set to 1 within the time interval, it means that lamp 200 has actually received the color control package PK1 carrying the PWM1 and the PWM2 able to control the lamp 200, and then process proceeds to step S1165. If the value of the ACK flag is not set to 1 within the time interval, it means that lamp 200 has not received the color control package PK1 yet due to disconnection between the lamp 200 and the control device 100 or other possible reason, and thus process proceeds to step S1166 to close the Tx thread and a receiving thread (hereinafter referred to as Rx thread and described below).

In step S1165, the control unit 120 sets the value of the Tx flag and the value of the ACK flag to 0 (that is, the Tx flag and the ACK flag is cleared), and then process returns to step S1161.

In step S118, the control unit 120 opens the Rx thread for receiving any package from the lamp 200.

In step S1181, the control unit 120 determined whether a lamp package PK2 from the lamp 200 is received. The lamp package PK2 may be a responding package (hereinafter referred to as ACK package) or a non-ACK package. In detail, after the lamp 200 receives the color control package PK1 from the control device 100, the lamp 200 will transmits the ACK package to the control device 100 to inform the control device 100 of being received the color control package PK1. That is, if the control device 100 receives the ACK package, it means that the lamp 200 has actually received the color control package PK1 carrying the PWM1 and the PWM2 able to control the lamp 200. In contrary, if the lamp 200 is damaged or other possible reason, the non-ACK package may be transmitted to the control device 100 to inform the control device 100 of the damage massage. That is, although the control device 100 receives the non-ACK package, it means that the lamp 200 may not receive the color control package PK1, and thus process returns to step S1181.

In step S1182, the control unit 120 pareses the lamp package PK2 to obtain messages within the lamp package PK2.

In step S1183, the control unit 120 determines whether the lamp package PK2 is the ACK package. If the lamp package PK2 is the ACK package, it means that the lamp 200 has actually received the color control package PK1, and then process proceeds to step S1184. If the lamp package PK2 is non-ACK package, it means that the lamp 200 may have been damaged, and thus process returns to step S1185. In step S1185, the control device 100 can output a damage message, a warning message or other appropriate massage of the lamp 200 for user. For example, the outputting device 110 can display a pop-up warning window to inform the user of damage to the lamp 200.

In step S1184, the control unit 120 sets the value of the ACK flag to 1 (when the ACK flag is 1, which means the lamp 200 has received the color control package PK1) for step S1164 being capable of certainly proceeding to step S1165, and sets the value of the Tx flag to 0 for step S1146 being capable of certainly proceeding to step S1147.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method of a lamp, comprising:
   whether a touch event occurs in a control device is determined;
   obtaining a coordinate of a touch point if the touch event occurs;
   whether the touch point occurs in a color control area of a Graphical User Interface (GUI) of the control device is determined;
   responding to a color temperature set and a brightness set from the control device, generating a first pulse width modulation (PWM) and a second PWM;
   whether the lamp connects with the control device is determined;
   package the first PWM and the second PWM in a color control package;
   opening a transmission thread, comprising:
      whether the value of a transmission flag is equal to 1 is determined;
      transmitting the color control package to the lamp by wireless technology if the value of the transmission flag is equal to 1;
      setting the value of a responding flag to 0; and
      whether the value of the responding flag is set to 0 within a time interval is determined;
   opening a receiving thread, comprising:
      whether a lamp package from the lamp is received is determined;
      whether the lamp package is a responding package is determined if the lamp package from the lamp is received;
      setting the value of the responding package to 1 and the value of the transmission flag to 0 if the lamp package is the responding package;

2. The control method of a lamp according to claim 1, further comprising:
   if the touch point occurs in the color control area, generating the first PWM and the second PWM.

3. The control method of a lamp according to claim 1, further comprises:
   whether the first PWM and the second PWM are different from a previous first PWM and a previous second PWM is determined;
   whether the lamp connects with the control device is confirmed if the first PWM and the second PWM are different from the previous first PWM and the previous second PWM;
   whether the value of the transmission flag is equal to 0 is determined if the lamp connecting with the control device; and
   if the value of the transmission flag is equal to 0, generating the first PWM and the second PWM and setting the value of the transmission flag to 1.

4. The control method of a lamp according to claim 2, wherein before the step of whether the touch event occurs in the control device being determined, the step of opening the transmission thread and the step of opening the receiving thread, the control method further comprises:
   whether the lamp connects with the control device is determined; and
   performing the step of whether the touch event occurs in the control device being determined, the step of opening the transmission thread and the step of opening the receiving thread by Time Division Multiplexing (TDM) if the lamp connects with the control device.

5. The control method of a lamp according to claim 4, further comprising:
   setting value of the transmission flag and the value of the responding flag to 0 if the lamp disconnects from the control device.

6. The control method of a lamp according to claim 1, further comprising:
   closing the transmission thread and the receiving thread if the value of the responding flag is not set to 1 within the time interval; and
   setting the responding flag and the transmission flag to 0.

7. The control method of a lamp according to claim 1, further comprising:
   setting the value of the transmission flag and the value of the responding flag to 0 if the value of the responding flag is set to 1 within the time interval; and
   returning to the step of whether the value of the transmission flag is equal to 1 being determined.

8. The control method of a lamp according to claim 1, wherein the step of opening the transmission thread further comprises:
   returning to the step of whether the transmission flag is equal to 1 being determined if the responding flag is not equal to 1.

9. The control method of a lamp according to claim 1, wherein in the step of whether the value of the responding flag is set to 1 within the time interval being determined, the time interval is 500 milliseconds.

10. The control method of a lamp according to claim 1, wherein the lamp comprises a first light-emitting element and a second light-emitting element which are controlled by the first PWM and the second PWM, respectively.

11. The control method of a lamp according to claim 1, wherein in the step of generating the first PWM and the second PWM, the first PWM and the second PWM are decided by:

$$PWM1 = \frac{0.0015 \times Br - 0.084}{0.002 \times e^{(0.0021 \times CCT)} + 0.996}$$

$$PWM2 = 0.996 \times PWM1 + 0.0051 \times Br - 0.0084$$

wherein, the PWM1 represents the first PWM, PWM2 represents the second PWM, the Br represents the brightness set, and the CCT represents the color temperature set.

* * * * *